(12) United States Patent
Huang (10) Patent No.: US 10,198,664 B2
(45) Date of Patent: Feb. 5, 2019

(54) AUXILIARY OBSERVING METHOD AND AUXILIARY OBSERVING APPARATUS

(71) Applicant: BEIJING ZHIGU RUI TUO TECH CO., LTD., Beijing (CN)

(72) Inventor: Weicai Huang, Beijing (CN)

(73) Assignee: Beijing Zhigu Rui Tuo Tech Co., Ltd., Beijing (CN)

(*) Notice: Subject to any disclaimer, the term of this patent is extended or adjusted under 35 U.S.C. 154(b) by 0 days.

(21) Appl. No.: 14/787,234

(22) PCT Filed: Jan. 22, 2014

(86) PCT No.: PCT/CN2014/071133
§ 371 (c)(1),
(2) Date: Oct. 26, 2015

(87) PCT Pub. No.: WO2015/043128
PCT Pub. Date: Apr. 2, 2015

(65) Prior Publication Data
US 2016/0078315 A1    Mar. 17, 2016

(30) Foreign Application Priority Data
Sep. 30, 2013   (CN) .......................... 2013 1 0462953

(51) Int. Cl.
*G06K 9/00* (2006.01)
*G06K 9/62* (2006.01)
(Continued)

(52) U.S. Cl.
CPC ............. *G06K 9/6215* (2013.01); *G06K 9/20* (2013.01); *G06K 9/46* (2013.01); *G06K 9/6201* (2013.01);
(Continued)

(58) Field of Classification Search
None
See application file for complete search history.

(56) References Cited

U.S. PATENT DOCUMENTS 5,915,250 A * 6/1999 Jain ................... G06F 17/30256
8,107,541 B2 * 1/2012 Divakaran ........ G06F 17/30787
375/240.28
(Continued)

FOREIGN PATENT DOCUMENTS

CN        1610522       4/2005
CN        1740970       3/2006
(Continued)

OTHER PUBLICATIONS

PCT International Search Report dated Jun. 11, 2014, issued in corresponding International Application No. PCT/CN2014/071133 (5 pages).
(Continued)

*Primary Examiner* — Hadi Akhavannik
(74) *Attorney, Agent, or Firm* — Sheppard, Mullin, Richter & Hampton LLP (57) ABSTRACT

The present application discloses an auxiliary observation method and an auxiliary observation apparatus, and relates to the field of multimedia information processing technologies. The method comprises the following steps: determining at least one comparison object according to a feature of an observation target; and determining a part of or all differences between the observation target and the at least one comparison object. The method and the apparatus in embodiments of the present application can prevent a case in which important information is overlooked or redundant unimportant information is highlighted, and also improve efficiency of observing information, in particular important information.

18 Claims, 4 Drawing Sheets

(51) Int. Cl.
*G06K 9/20* (2006.01)
*G06K 9/46* (2006.01)
*G06K 9/68* (2006.01)

(52) U.S. Cl.
CPC ..... *G06K 9/685* (2013.01); *G06K 2009/4666* (2013.01)

(56) References Cited

U.S. PATENT DOCUMENTS

| | | | |
|---|---|---|---|
| 8,724,909 B2* | 5/2014 | Quack | G06F 17/30256 382/100 |
| 2003/0149526 A1* | 8/2003 | Zhou | G01S 5/0027 701/408 |
| 2007/0009136 A1* | 1/2007 | Pawlenko | G06K 9/3241 382/104 |
| 2009/0015585 A1* | 1/2009 | Klusza | G06F 17/3028 345/420 |
| 2009/0092336 A1* | 4/2009 | Tsurumi | G06K 9/3216 382/294 |
| 2010/0066822 A1* | 3/2010 | Steinberg | G06K 9/00208 348/77 |
| 2011/0013846 A1* | 1/2011 | Hori | G06T 7/001 382/218 |
| 2011/0135154 A1 | 6/2011 | Wedge | |
| 2011/0249910 A1* | 10/2011 | Henderson | G06K 9/00134 382/278 |
| 2014/0266714 A1* | 9/2014 | Becker Antley | G06Q 10/107 340/540 |

FOREIGN PATENT DOCUMENTS

| | | |
|---|---|---|
| CN | 101246517 | 8/2008 |
| CN | 201278180 Y | 7/2009 |
| CN | 101527135 | 9/2009 |
| CN | 101542520 A | 9/2009 |
| CN | 103327235 | 9/2013 |
| CN | 103500282 A | 1/2014 |

OTHER PUBLICATIONS

Office Action for CN App. No. 201310462953.5, dated Aug. 12, 2016, 28 pages.
Written Opinion for PCT App. No. PCT/CN2014/071133, dated Jun. 11, 2014, 9 pages.

* cited by examiner

AUXILIARY OBSERVING METHOD AND AUXILIARY OBSERVING APPARATUS

CROSS-REFERENCE TO RELATED APPLICATIONS

This application is a national stage application of International Application No. PCT/CN2014/071133, filed on Jan. 22, 2014, which claims priority to and the benefit of Chinese Patent Application No. 201310462953.5, filed with the State Intellectual Property Office of P.R. China on Sep. 30, 2013, and entitled "AUXILIARY OBSERVING METHOD AND AUXILIARY OBSERVING APPARATUS". The contents of both of the above-referenced applications are herein incorporated by reference in their entirety.

BACKGROUND

Technical Field

The present application relates to the field of multimedia information processing technologies, and in particular, to an auxiliary observation method and an auxiliary observation apparatus.

Background

A research shows that, when an eye of a person looks at a certain object (including a person, a scenery, an article, a picture, and an image displayed on a computer, and the like), even if there is enough time, in most cases, not all details of the object will be noticed by the person, and even important content can be ignored easily. For example, during viewing of a financial statement with lots of data, a certain piece of key data hidden in the data is not easy to be noticed.

There is an existing auxiliary observation manner: Two observation objects are compared and a difference between them is highlighted, so that a user can notice important information in the observation objects more easily. For example, thumbnail images are compared, to differentiate a selected image from one or more other images, and determine a difference image of a part of the selected image, which is different from that of the one or more other images. Subsequently, a magnified view of the difference image is displayed on a display, and the difference image may show a difference between the selected image and the one or more other images.

However, two major problems exist in existing methods: 1) one or more comparison objects must be given in advance; and 2) difference comparison between images is always implemented based on visual characteristics of the images, wherein the visual characteristics herein mainly refer to color, shape, brightness, size, and the like, which, in many cases, cannot effectively highlight content that the user really needs to care about. For example, between two financial statements, a difference exists between some data (for example, 0.9999999 and 1.0) which is minor and should not be cared about by the user, but visual characteristics of these data may be possibly of a great difference, and therefore the difference is easy to be highlighted through conventional technology; however, numerical values of some other data are of a great difference (for example, 100000 and 1.00000), but visual characteristics of such data are possibly of a minor difference, and therefore the difference is not easy to be highlighted through the conventional technology.

Therefore, using existing methods, the probability of missing important information may be reduced by a certain degree, however, situations still exist where important information is missed, or redundant unimportant information is highlighted, which reduces efficiency of observing information, particularly important information.

SUMMARY

One objective of the present application is to provide an auxiliary observation method and an auxiliary observation apparatus, which can improve efficiency of observing information, in particular important information.

To achieve the foregoing objective, in one aspect, an embodiment of the present application provides an auxiliary observation method, wherein the method comprises the following steps:

determining at least one comparison object according to a feature of an observation target; and determining a part of or all differences between the observation target and the at least one comparison object.

In a second aspect, an embodiment of the present application provides an auxiliary observation apparatus, wherein the apparatus comprises:

a comparison object determining module, configured to determine at least one comparison object according to a feature of an observation target; and an auxiliary observation module, configured to determine a part of or all differences between the observation target and the at least one comparison object.

In a third aspect, an embodiment of the present application provides a computer readable storage medium, wherein the computer readable storage medium comprises executable instructions, and when a central processing unit (CPU) of an auxiliary observation apparatus executes the executable instructions, the executable instructions cause the auxiliary observation apparatus to execute the following method:

determining at least one comparison object according to a feature of an observation target; and determining a part of or all differences between the observation target and the at least one comparison object.

In a fourth aspect, an embodiment of the present application provides an auxiliary observation apparatus, comprising a CPU and a memory, wherein the memory stores a computer-executable instructions, the CPU is connected to the memory by a communication bus, and when the auxiliary observation apparatus operates, the CPU executes the computer-executable instructions stored in the memory, causing the auxiliary observation apparatus to execute the following method:

determining at least one comparison object according to a feature of an observation target; and determining a part of or all differences between the observation target and the at least one comparison object.

The method and the apparatus in the embodiments of the present application may avoid situations in which important information is missed or redundant unimportant information is observed, and also improve efficiency of observing information, important information in particular.

DETAILED DESCRIPTION

The following further describes specific embodiments of the present application in detail with reference to accompanying drawings and embodiments. The following embodiments are used to explain the present application, but are not used to limit the scope of the present application.

In the embodiments of the present application, an observation target may be a person, a scenery, an article, a picture, a photograph, and an image, and any other visual object displayed on a display device with a display function (for example, a mobile phone, a tablet, a television set, a projection screen, a camera, or the like).

Figure 1:
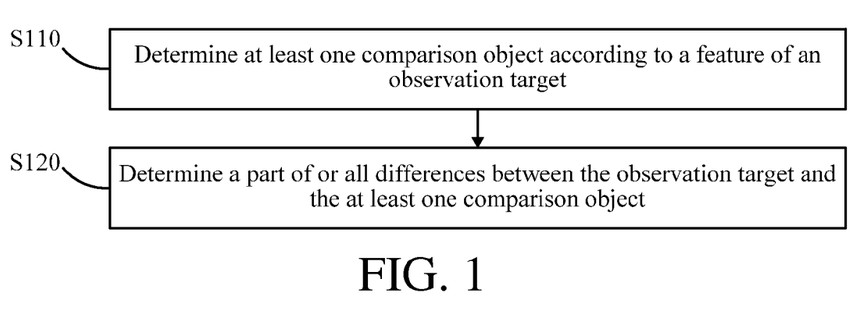
FIG. 1 is an example flowchart of an auxiliary observation method according to an embodiment of the present application.

As shown in FIG. 1, an auxiliary observation method provided by an embodiment of the present application comprises the following steps:

S110: Determine at least one comparison object according to a feature of an observation target.

In the method consistent with this embodiment of the present application, the "feature" according to which the comparison object is determined may comprise one or more of a context, metadata, a visual feature, semantic, and a circumstance of selected content. The selected content is a specific type of content on the observation target or content within a specific area on the observation target. The context of the selected content relates in particular to a case in which the observation target is an article or is extracted from an article. The "context" may also refer to an association in terms of time, and in this case, the observation target may be a person, and may also be a thing. The metadata is data that describes data and its environment, for example, a title of an article, a description about a shooting environment of a picture or a photograph, a description about a shooting parameter, a description about shooting content, or the like. The visual features may include a color, brightness, a shape, a size, a texture, a space relationship, or the like. The semantic refers to a meaning represented by a word, digital data, or even a special symbol (underline, bold, highlight, or the like).

Depending on different observation targets, a specific feature or a combination of specific features may be selected as a basis for determining the comparison object. For example, when the observation target is a person or scenery, the feature may be a visual feature that is presented by the observation target. When the observation target is a family member, a colleague, a friend, or the like, to highlight a change of current wear of the observation target, an image of the observation target, of which at least one visual feature within a recent time is similar to a current one, is selected as the comparison object; when the observation target is a scenery, and in order to highlight a change of a position of a certain thing in the scenery, an image at a moment when a space relationship of things is most similar to that in the observation target is selected as the comparison object; and when the observation object is an article, a picture, an image, or the like, an comparison object whose metadata, visual feature, context, semantic meaning, circumstance, and the like are most similar to those of the observation target may be selected, for example, article titles are similar, or shooting time and shooting content of the picture are respectively similar, and so on.

S120: Determine a part of or all differences between the observation target and the at least one comparison object.

After the at least one comparison object is determined in step S110, the observation target may be compared with the at least one comparison object, to find the specific difference between the two. According to different observation objectives of a user, the specific difference may be a part of or all differences between the two. In addition, in the method in the embodiment of the present application, the specific difference refers to a difference that not only exists in the form, but also in the semantic and is of significance to user's observation. For example, 0.9999999 and 1.0 are different in the visual feature, but the difference is not that obvious in the semantic, and even can be ignored as there is no referential value to the user. Such a difference is to be called an unspecific difference.

In summary, in the method in the embodiment of the present application, a comparison object can be selected according to a specific feature of the observation target more directionally and more intelligently, so as to highlight, by determining a difference between the two obtained by comparison, the most important content on the observation target (comprising an obvious change in time that occurs in a part of the observation target, or an obvious change that occurs in its position or environment, or a difference in its content), which prevents a case in which important information is overlooked or redundant unimportant information is highlighted, and also improves efficiency of observing information, in particular important information.

It should be noted that, before step S110, a step of obtaining a candidate comparison object may be included. The candidate comparison object may be a historical image of the at least one observation target from a same user or different users; and the candidate comparison object may be obtained locally or from an external device over Internet or in another way. For example, when the observation target is a person the user sees for the first time, a non-current-moment image of the observation target may be obtained from the external device, and be used as the candidate comparison object.

In step S110, the at least one comparison object is determined according to a degree of similarity to the feature of the observation target. For example, a most similar comparison object is selected. Certainly, in the method in the embodiment of the present application, more than one comparison object may be selected; and the selected comparison object is not limited to one that is most similar to the observation target, but the comparison object desired to be compared with may be selected from candidate comparison objects automatically or by the user, to highlight important information specifically suiting the user's need.

In addition, step S120 further comprises:

S121: Find a difference between the observation target and the at least one comparison object.

In this step, all differences between the observation target and the comparison object may be found, or it is desirable to find a difference for a selected region and/or selected content on the observation target. The selected region and/or selected content may be the region and/or content of interest to the user. Accordingly, step S121 may further comprise:

S1211: Capture the region of interest to the user in the observation target.

S1212: Find a difference in the region of interest.

The region of interest of the user in the observation target may be captured by various possible well-known ways in the art, for example, tracing a head movement and line of sight of the user, detecting a focusing position of line of sight of the user, or the like. Details are not provided herein.

In addition, the selected region and/or selected content may also be a preset region and/or content, for example, when the observation target is a bill, the preset region is an amount part, and the preset content may be digital data. The selected content may be content that is selected according to the context, the circumstance, and the like, and may also be selected according to a content type, for example, the selected content may be one or more of an image, a word, a number, and a special symbol. Observation targets may all be regarded as images in the user's perspective, and therefore, to find the difference, the selected content may be extracted first. Accordingly, step S121 may further comprise:

S1213: Extract selected content from the observation target.

S1214: Find a difference between the selected content and corresponding content in the comparison object.

The selected content may also be a specific type of content that within a specific region, for example, selected content within the region of interest to the user.

S122: Remind the user of a specific difference on the observation target.

After the difference between the observation target and the at least one comparison object is found, a specific difference is further found according to the user' need, and the user is reminded of that the specific differences need to be focused on. Certainly, the specific difference may also refer to all the differences.

It should be noted that, in steps S121, S1212, and S1214, methods for finding the difference are not exactly the same depending on different search targets. Specifically speaking:

If the observation target is an image or the selected content to be searched is an image, the method for finding the difference may be: determining a difference by comparing the two images in terms of a feature of a main part of an image, such as a color, a shape, a texture, a position, a posture, or a direction, or a characteristic such as feature distribution. A compared area may be the whole image, and may also be a part of an image, for example, an image block of a certain size. The difference in the feature or the characteristic such as the feature distribution may be a difference that is obtained by comparison and calculation pixel by pixel in a unit of pixel, and may also be a difference value that is obtained by comparison in a unit of image block of a certain size (consisting of multiple pixels). The difference value may be obtained by comparing feature values directly, and may also be obtained by comparing statistical distribution (for example, histogram statistics) of the features.

Accordingly, in step S122, corresponding to a case in which the observation target is an image or the selected content to be searched is an image, in determination of which differences between two images need to be used as the specific differences for reminding, it can be accomplished by presetting a reminder threshold, for example:

Setting the size of a unit comparison area (for example, set to 16*16 pixels).

Comparing feature values of object histograms (for example, a color distribution histogram, a gray level histogram, a Fourier transformation coefficient, and the like) in the unit comparison area or a local scope of the unit comparison area are compared, and if a resulting difference exceeds a preset threshold, the difference in the area is the specific difference.

Comparing feature values of shapes (for example, a rectangle degree, a circular degree, a Fourier descriptor, an invariant distance, a skeleton, and the like) in the unit comparison area or a local scope of the unit comparison area are compared, and if a resulting difference exceeds a preset threshold, the difference in the area is the specific difference.

Comparing comprehensive feature values (for example, a color, a texture, a shape, and a position) of objects in the unit comparison area or a local scope of the unit comparison area are compared, and if a resulting difference exceeds a preset threshold, the difference in the area is the specific difference.

If a difference between two images in terms of the distance to a certain feature object (for example, a relative distance and direction between a thing and the ground or between a thing and another thing) in an image exceeds a preset threshold, the difference in the area is the specific difference.

Differences between multiple compared areas in an image are comprehensively considered.

When the observation target is text or the selected content to be searched is text (what the user observes is an image, and therefore when the difference is found, the textual content in the image needs to be extracted by optical character recognition (OCR)), the method for finding the difference may be: determining a semantic similarity by comparison, that is, calculating the semantic similarity between the text in the observation target or the specific content to be searched and the corresponding text in the comparison object, and using a difference whose similarity is less than a reminder threshold as the specific difference for reminding. The following methods are available for calculating the semantic similarity:

Calculation is performed according to an ontology or a taxonomy. The method is also called a tree-based semantic similarity research method. There are two algorithms for tree-based semantic similarity calculation substantially: One is distance-based semantic similarity measurement, and the other is information-content-based semantic similarity measurement. Generally, a semantic dictionary (for example, Wordnet or Hownet) is used, wherein in all semantic dictionaries, all words are organized in a hierarchical structure in a form of one or several trees (refer to: Li Peng, Tao Lan, Wang Bizuo. Improved Ontology Semantic Similarity Calculation and Application Thereof [J]. Computer Engineering and Design, 2007(1): 227-229.).

Statistics is made by using a large-scale corpus. Most corpus-based word similarity researches use a context statistical description method, that is, such an assertion is agreed on: A context of a word can provide enough information for word definition. A word vector space model is a model that is currently used widely by statistics-based word similarity calculation policies, and can achieve algorithm complexity (refer to: Xia Tian. Chinese Word Semantic Similarity Calculation Research [J]. Computer Engineering, 2007(6): 191-194.).

Others: For example, the semantic similarity is calculated based on the amount of information comprised in two nodes in a tree structure, of which a basic idea is to conduct the research by using an information theory (refer to: Doan A, Madhavan J. Learning to Match Ontologies on the Semantic Web [J]. The VLDB Journal, 2003, 12(4): 116-120.).

It should be noted that, if languages are different (for example, Chinese and English), a semantic similarity analysis may be performed after translation.

When the observation target is a number or the selected content to be searched is a number (what the user observes is an image, and therefore during the search, the number content in the image also needs to be extracted by OCR), the difference may be found by differentiation of numbers (comprising a decimal point), measurement methods (a binary system, an octal system, a decimal system, a hexadecimal system, a time system, an angle, a temperature, a distance, fen/jiao/yuan, and the like), representation methods (a natural counting method, a scientific counting method, a logarithm counting method, and the like), and measurement units (meter, foot, degree, square meter, cubic meter, and the like). If the measurement units are different, the comparison is performed after unification. Then, the comparison is performed after conversion to a unified counting method. If a comparison result indicates a difference or the difference exceeds the reminder threshold, the difference is used as the specific difference to remind the user.

When the observation target is a special symbol or the selected content to be searched is a special symbol, because the special symbol generally has an emphasis function, in the method in the embodiment of the present application, the object with any special symbols are all used as the special differences for reminding.

In addition, in step S122 in the method in the embodiment of the present application, the user may be reminded in one or more of the following manners: a visual reminder, a sound reminder, a touch reminder, and a vibration reminder. For example, the user is reminded by superimposing a visual symbol on the observation target. If there is a visual symbol at a corresponding position on the observation target already, a visual symbol different from this symbol is used to remind the user, wherein the visual symbol may also be a passage of prompt words that is visible to the user. The sound reminder may be given synchronously with content that the user currently gazes at, for example, when the user sees some specific differences, the user is reminded by using a sound. The touch reminder refers to that a touch feedback is used to remind the user when the user touches a specific difference. The vibration reminder is similar.

The method in the embodiment of the present application further comprises the following step:

S130: Store the image of the observation target, for using the image as a candidate comparison object by the current user or another user.

In summary, the method in the embodiment of the present application prevents a case in which important information is missed or redundant unimportant information is observed, and also improves efficiency of observing information, in particular important information.

It should be understood that, in various embodiments of the present application, sequence numbers of the foregoing process do not mean an executing sequence. The executing sequence of each process should be determined according to the functions and internal logic of the process, and should not constitute any limit to an implementation process of the embodiments of the present application.

Figure 2:
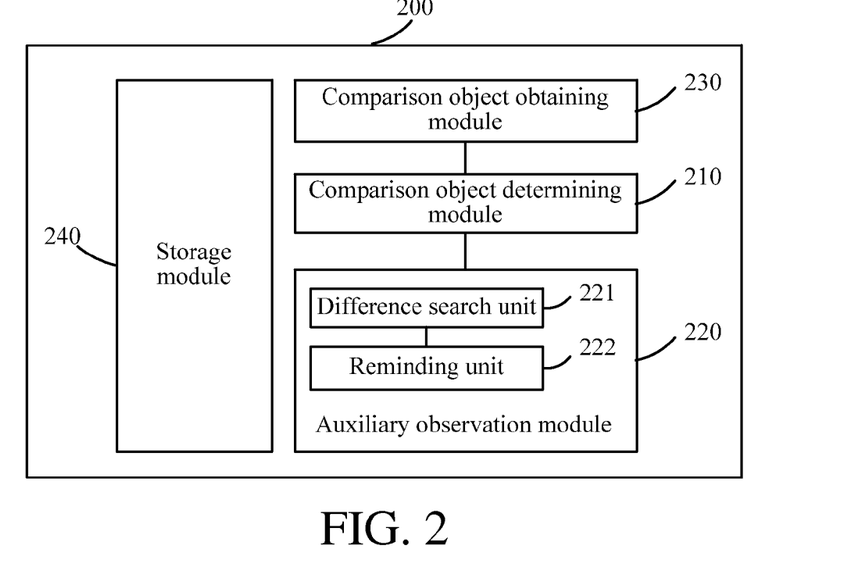
FIG. 2 is a first structural block diagram of an auxiliary observation apparatus according to an embodiment of the present application.

An embodiment of the present application further provides an auxiliary observation apparatus, wherein the apparatus may be glasses wearable to a user (frame glasses, contact lenses, or the like) or a device with a display function (for example, a mobile phone, a tablet, a television set, a projection screen, a camera, or the like), or be used as a part of the glasses or the device. As shown in FIG. 2, an auxiliary observation apparatus 200 in the embodiment of the present application comprises: a comparison object determining module 210 and an auxiliary observation module 220.

The comparison object determining module 210 is configured to determine at least one comparison object according to a feature of an observation target.

In the apparatus in the embodiment of the present application, the "feature" according to which the comparison object determining module 210 determines the comparison object may comprise one or more of a context, metadata, a visual feature, semantic, and a circumstance of selected content. The context of the selected content relates in particular to a case within which the observation target is an article or is extracted from an article. The "context" may also refer to an association in terms of time, and in this case, the observation target may be a person, and may also be a thing. The metadata is data that describes data and its environment, for example, a title of an article, a description about a shooting environment of a picture or a photograph, a description about a shooting parameter, a description about shooting content, or the like. The visual feature may include a color, brightness, a shape, a size, a texture, a space relationship, or the like. The semantic refers to a meaning represented by a word, digital data, or even a special symbol (underline, bold, highlight, or the like).

Depending on different observation targets, a specific feature or a combination of specific features may be selected as a basis for determining the comparison object. For example, when the observation target is a person or scenery, the feature may be a visual feature that is presented by the observation target. When the observation target is a family member, a colleague, a friend, or the like, to highlight a change of current wear of the observation target, an image of the observation target, of which at least one visual feature within a recent time is similar to a current one, is selected as the comparison object; when the observation target is a scenery, to highlight a change of a position of a certain thing in the scenery, an image at a moment when a space relationship of things is most similar to that in the observation target is selected as the comparison object; and when the observation object is an article, a picture, an image, or the like, an comparison object whose metadata, visual feature, context, semantic meaning, circumstance, and the like are most similar to those of the observation target may be selected, for example, article titles are similar, or shooting time and shooting content of the picture are respectively similar, and so on.

The auxiliary observation module 220 is configured to determine a part of or all differences between the observation target and the at least one comparison object.

After the comparison object determining module 210 determines the at least one comparison object, the auxiliary observation module 220 may compare the observation target with the at least one comparison object, to find the specific difference between the two. According to different observation objectives of a user, the specific difference may be a part of or all differences between the two. In addition, in the apparatus of the embodiment of the present application, the specific difference refers to a difference that not only exists in the form, but also exists in the semantic and is of significance for user to observe. For example, 0.9999999 and 1.0 are different in the visual feature, but the difference is not that obvious in the semantic, and even can be ignored as there is no referential value to the user. Such a difference is to be called an unspecific difference.

In summary, in the apparatus in the embodiment of the present application, a comparison object can be selected according to a specific feature of the observation target more directionally and more intelligently, so as to highlight, by determining a difference between the two obtained by comparison, the most important content on the observation target (comprising an obvious change in time that occurs in a part of the observation target, or an obvious change that occurs in its position or environment, or a difference in its content), which prevents a case in which important information is overlooked or redundant unimportant information is highlighted, and also improves efficiency of observing information, in particular important information.

The apparatus 200 further comprises a comparison object obtaining module 230, configured to obtain a candidate comparison object before the comparison object determining module 210 determines the at least one comparison object. The candidate comparison object may be a historical image of the at least one observation target from a same user or different users; and the candidate comparison object may be obtained locally or from an external device over the Internet or through another way. Accordingly, the apparatus 200 in the embodiment of the present application may further comprise a communications module, to implement communication with an external device. For example, when the observation target is a person the user sees for the first time, a non-current-moment image of the observation target may be obtained from the external device, and be used as the candidate comparison object.

The comparison object determining module 210 determines the at least one comparison object according to a degree of similarity to the feature of the observation target. For example, a most similar comparison object is selected. Certainly, in the apparatus in the embodiment of the present application, more than one comparison object may be selected; and the selected comparison object is not limited to one that is most similar to the observation target, but the comparison object desired to be compared may be selected from candidate comparison objects automatically or by the user, to highlight important information according to the user's need more directionally.

In addition, the auxiliary observation module 220 may further comprise:

a difference search unit 221, configured to find a difference between the observation target and the at least one comparison object.

Figure 3:
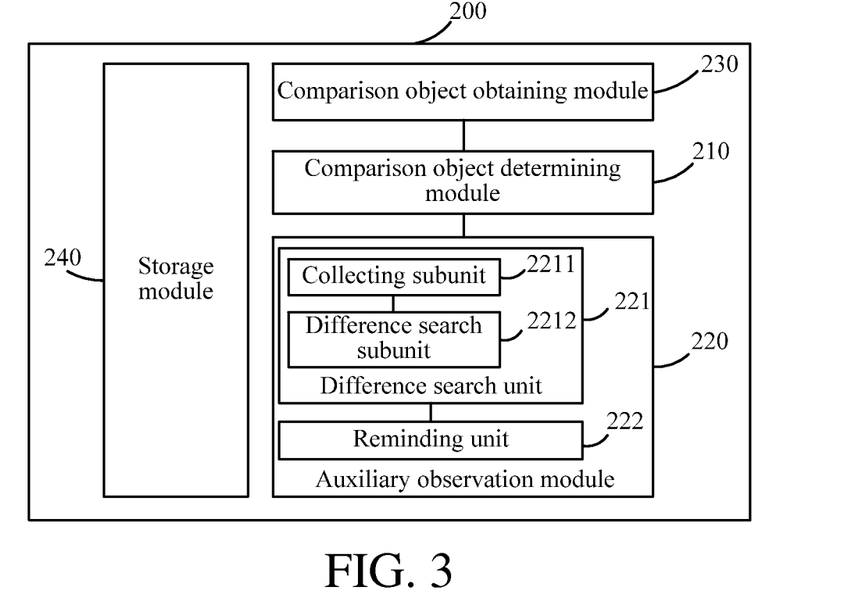
FIG. 3 is a second structural block diagram of an auxiliary observation apparatus according to an embodiment of the present application.

The difference search unit 221 may find all differences between the observation target and the comparison object, and it is desirable to find a difference for a selected region and/or selected content on the observation target. The selected region and/or selected content may be the region and/or content of interest of the user. Accordingly, as shown in FIG. 3, the difference search unit 221 may further comprise:

a capturing subunit 2211, configured to capture the region of interest to the user in the observation target; and a difference search subunit 2212, configured to find a difference in the region of interest.

The capturing subunit 2211 may capture the region of interest to the user in the observation target by various possible well-known ways in the art, for example, tracing a head movement and line of sight of the user, detecting a focusing position of line of sight of the user, or the like. Details are not provided herein.

Figure 4:
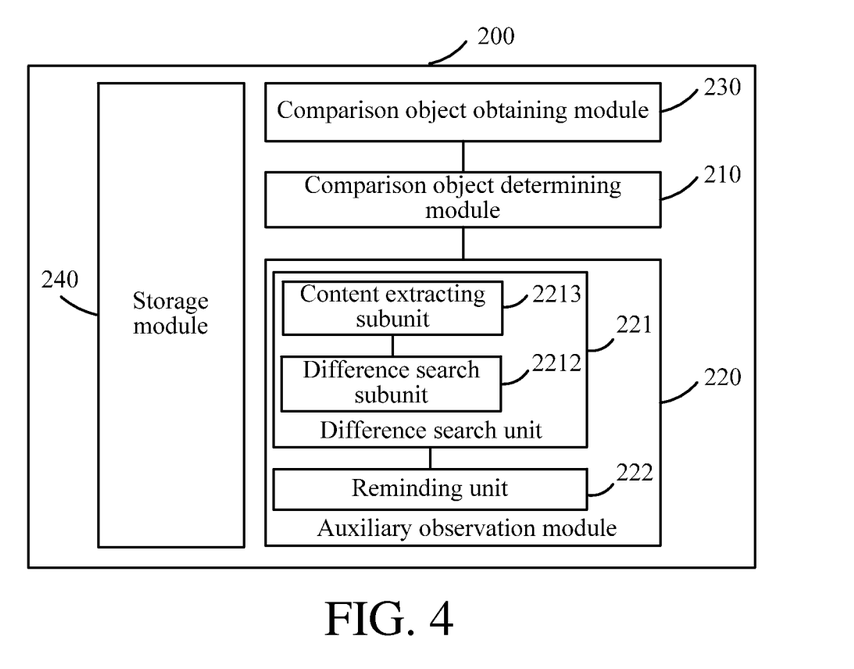
FIG. 4 is a third structural block diagram of an auxiliary observation apparatus according to an embodiment of the present application.

In addition, the selected region and/or selected content may also be a preset region and/or content, for example, when the observation target is a bill, the preset region is an amount part, and the preset content may be digital data. The selected content may be content that is selected according to the context, the circumstance, and the like, and may also be selected according to a content type, for example, the selected content may be one or more of an image, a word, a number, and a special symbol. Observation targets may all be regarded as images in the user's perspective, and therefore, to find the difference, the selected content may be extracted first. Accordingly, as shown in FIG. 4, the difference search unit 221 may further comprise:

a content extracting subunit 2213, configured to extract selected content from the observation target; and the difference search subunit 2212 is further configured to find a difference between the selected content and corresponding content in the comparison object.

Figure 5:
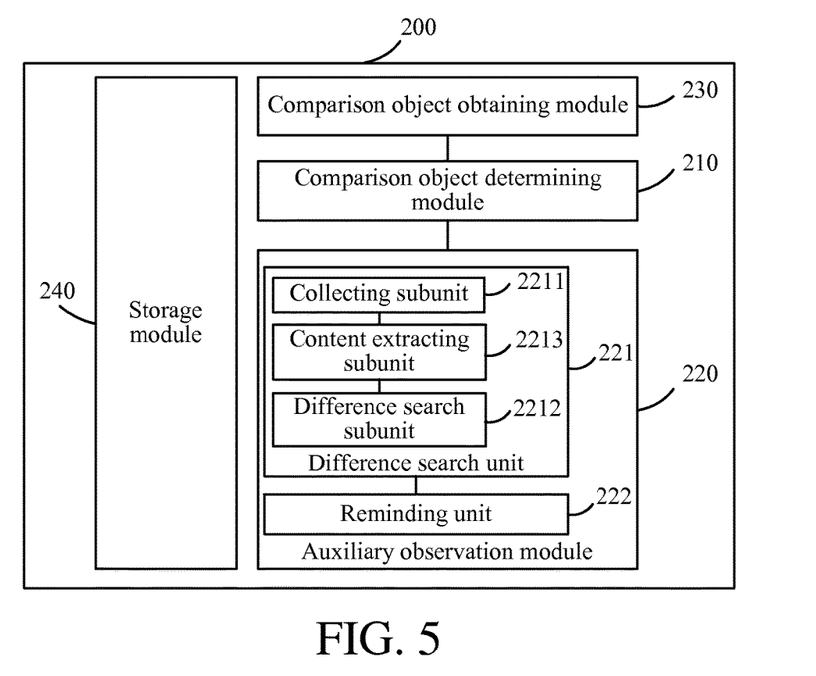
FIG. 5 is a fourth structural block diagram of an auxiliary observation apparatus according to an embodiment of the present application.

The selected content may also be a selected type of content that is located in a selected region, for example, selected content within the region of interest to the user, that is, as shown in FIG. 5, the difference search unit 221 may simultaneously comprise the capturing subunit 2211, the difference search subunit 2212, and the content extracting subunit 2213.

As shown in FIG. 2 to FIG. 5, the auxiliary observation module 220 further comprises: a reminding unit 222, configured to remind the user of a specific difference on the observation target.

After finding the difference that exists between the observation target and the at least one comparison object, the difference search unit 221 further finds a specific difference according to the user's need, and reminds the user which specific differences need to be focused on. Certainly, the specific difference may also refer to all the differences.

It should be noted that, methods for the difference search unit 221 to find the difference are not exactly the same according to different search targets. Specifically speaking:

If the observation target is an image or the selected content to be searched is an image, the method for finding the difference may be: determining a difference by comparing the two images in terms of a feature of a main part of an image, such as a color, a shape, a texture, a position, a posture, or a direction, or a characteristic such as feature distribution. A compared area may be the whole image, and may also be a part of an image, for example, an image block of a certain size. The difference in the feature or the characteristic such as the feature distribution may be a difference that is obtained by comparison and calculation pixel by pixel in a unit of pixel, and may also be a difference value that is obtained by comparison in a unit of image block of a certain size (consisting of multiple pixels). The difference value may be obtained by comparing feature values directly, and may also be obtained by comparing statistical distribution (for example, histogram statistics) of the features.

Accordingly, corresponding to a case in which the observation target is an image or the selected content to be searched is an image, in determination of which differences between two images need to be used as the specific differences for reminding, it can be accomplished by presetting a reminder threshold, for example:

Setting the size of a unit comparison area (for example, set to 16*16 pixels).

Comparing feature values of object histograms (for example, a color distribution histogram, a gray level histogram, a Fourier transformation coefficient, and the like) in the unit comparison area or a local scope of the unit comparison area are compared, and if a resulting difference exceeds a preset threshold, the difference in the area is the specific difference.

Comparing feature values of shapes (for example, a rectangle degree, a circular degree, a Fourier descriptor, an invariant distance, a skeleton, and the like) in the unit comparison area or a local scope of the unit comparison area are compared, and if a resulting difference exceeds a preset threshold, the difference in the area is the specific difference.

Comparing comprehensive feature values (for example, a color, a texture, a shape, and a position) of objects in the unit comparison area or a local scope of the unit comparison area are compared, and if a resulting difference exceeds a preset threshold, the difference in the area is the specific difference.

If a difference between two images in terms of the distance to a certain feature object (for example, a relative distance and direction between a thing and the ground or between a thing and another thing) in an image exceeds a preset threshold, the difference in the area is the specific difference.

Differences between multiple compared areas in an image are comprehensively considered.

When the observation target is text or the selected content to be searched is a text (what the user observes is an image, and therefore when the difference is found, the textual content in the image needs to be extracted by OCR), the method for finding the difference may be: determining a semantic similarity by comparison, that is, calculating the semantic similarity between the text in the observation target or the specific content to be searched and the corresponding text in the comparison object, and using a difference whose similarity is less than the reminder threshold as the specific difference for reminding. The following methods are available for calculating the semantic similarity:

Calculation is performed according to an ontology or a taxonomy. The method is also called a tree-based semantic similarity research method. There are two algorithms for tree-based semantic similarity calculation substantially: One is distance-based semantic similarity measurement, and the other is information-content-based semantic similarity measurement. Generally, a semantic dictionary (for example, Wordnet or Hownet) is used, wherein in all semantic dictionaries, all words are organized in a hierarchical structure in a form of one or several trees (refer to: Li Peng, Tao Lan, Wang Bizuo. Improved Ontology Semantic Similarity Calculation and Application Thereof [J]. Computer Engineering and Design, 2007(1): 227-229.).

Statistics is made by using a large-scale corpus. Most corpus-based word similarity researches use a context statistical description method, that is, such an assertion is agreed: A context of a word can provide enough information for word definition. A word vector space model is a model that is currently used widely by statistics-based word similarity calculation policies, and can achieve algorithm complexity (refer to: Xia Tian. Chinese Word Semantic Similarity Calculation Research [J]. Computer Engineering, 2007(6): 191-194.).

Others: For example, the semantic similarity is calculated based on the amount of information comprised in two nodes in a tree structure, of which a basic idea is to conduct the research by using an information theory (refer to: Doan A, Madhavan J. Learning to Match Ontologies on the Semantic Web [J]. The VLDB Journal, 2003, 12(4): 116-120.).

It should be noted that, if languages are different (for example, Chinese and English), a semantic similarity analysis may be performed after translation.

When the observation target is a number or the selected content to be searched is a number (what the user observes is an image, and therefore during the search, the number content in the image also needs to be extracted by OCR), the difference may be found by distinguishing numbers (comprising a decimal point), measurement methods (a binary system, an octal system, a decimal system, a hexadecimal system, a time system, an angle, a temperature, a distance, fen/jiao/yuan, and the like), representation methods (a natural counting method, a scientific counting method, a logarithm counting method, and the like), and measurement units (meter, chi, degree, square meter, cubic meter, and the like). If the measurement units are different, the comparison is performed after unification. Then, the comparison is performed after conversion to a unified counting method. If a comparison result indicates a difference or the difference exceeds the reminder threshold, the difference is used as the specific difference to remind the user.

When the observation target is a special symbol or the selected content to be searched is a special symbol, because the special symbol generally has an emphasis function, in the apparatus in the embodiment of the present application, the object with any special symbols are all used as the special differences for reminding.

In addition, in the apparatus in the embodiment of the present application, the reminding unit 222 may remind the user in one or more of the following manners: a visual reminder, a sound reminder, a touch reminder, and a vibration reminder. For example, the user is reminded by superimposing the visual symbol on the observation target. If there is a visual symbol at a corresponding position on the observation target already, a visual symbol different from this symbol is used to remind the user, wherein the visual symbol may also be a passage of virtual prompt words that is superimposed on the image and is visible to the user. The sound reminder may be given synchronously with content that the user currently gazes at, for example, when the user sees some specific differences, the user is reminded by using a sound. The touch reminder refers to that a touch feedback is used to remind the user when the user touches a specific difference. The vibration reminder is similar.

The apparatus in the embodiment of the present application further comprises:

a storage module 240, configured to store the image of the observation target, for using the image as a candidate comparison object of the current user or another user.

In summary, the apparatus in the embodiment of the present application prevents a case in which important information is missed or redundant unimportant information is observed, and also improves efficiency of observing information, in particular important information.

In addition, an embodiment of the present application further provides a computer readable media (or medium), comprising computer readable instructions for performing the following operations when being executed: the operations of performing step S110 to step S130 in the foregoing method embodiment.

Figure 6:
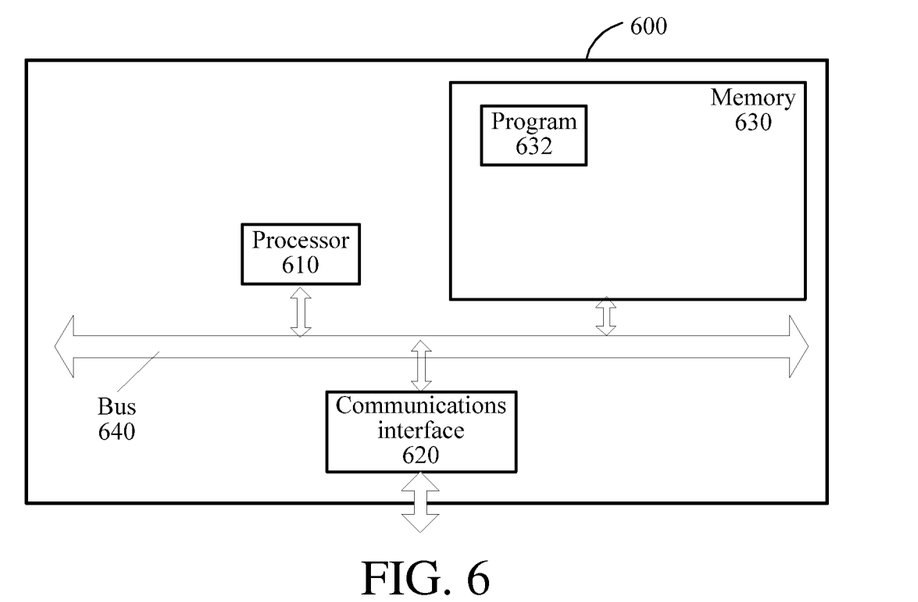
FIG. 6 is another example schematic structural diagram of an auxiliary observation apparatus according to an embodiment of the present application.

FIG. 6 is a schematic structural diagram of an auxiliary observation apparatus 600 according to an embodiment of the present application. Specific embodiments of the present application do not limit specific implementations of the auxiliary observation apparatus 600. As shown in FIG. 6, the auxiliary observation apparatus 600 may comprise:

a processor 610, a communications interface 620, a memory 630, and a communications bus 640, where:

the processor 610, the communications interface 620, and the memory 630 complete mutual communication by using the communications bus 640;

the communications interface 620 is configured to communicate with a network element such as a client; and the processor 610 is configured to execute a program 632, and specifically can execute relevant steps in the foregoing method embodiment shown in the FIG. 1.

Specifically, the program 632 may comprise program code, and the program code comprises computer execution instructions.

The processor 610 may be a CPU, or an application specific integrated circuit (ASIC), or may be configured to one or more integrated circuits that implement the embodiments of the present application.

The memory 630 is configured to store the program 632. The memory 630 may comprise a high-speed random access memory (RAM), and may further comprise a non-volatile memory, for example, at least one magnetic disk memory. The program 632 may specifically enable the apparatus 600 to perform the following steps:

determining at least one comparison object according to a feature of an observation target; and determining a part of or all differences between the observation target and the at least one comparison object.

For specific implementations of various units in the program 632, reference may be made to the corresponding steps or units in the embodiments of the present application, and details are not provided herein.

A person of ordinary skill in the art may be aware that, in combination with the examples described in the embodiments disclosed in this specification, units and method steps of may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond a scope of the present application.

When the functions are implemented in a form of a software functional unit and sold or used as an independent product, the functions may be stored in a computer readable storage medium. Based on such an understanding, the technical solutions of the present application essentially, or a part contributing to the prior art, or a part of the technical solutions may be implemented in a form of a software product. The software product is stored in a storage medium, and comprises multiple instructions for instructing a computer device (which may be a personal computer, a server, or a network device) to perform all or a part of the steps of the methods described in the embodiments of the present application. The foregoing storage medium comprises: any medium that can store program code, such as a USB flash drive, a removable hard disk, a read-only memory (ROM), a RAM, a magnetic disk, or an optical disc.

The foregoing implementation manners are merely used to describe the present application, but not used to limit the present application. A person of ordinary skill in the relevant art may also perform various changes and variations without departing from the spirit and scope of the present application. Therefore, all equivalent technical solutions also fall within the scope of the present application, and the patent protection scope of the present application shall be subject to the claims.

What is claimed is:

1. An auxiliary observation method, comprising:
determining at least one comparison object according to a degree of similarity to a feature of an observation target, wherein the feature comprises at least one of the following: a context, metadata, a visual feature, semantic meaning, and a circumstance of selected content, and
wherein the at least one comparison object comprises a historical image of the observation target;
finding a difference that is both visual and semantic between the observation target and the at least one comparison object;
presetting a reminder threshold for semantic difference; and
in response to determining that semantic difference of the difference exceeds the reminder threshold for semantic difference, determining the difference as a specific difference for reminding to prevent a user from overlooking important information or highlighting redundant information.

2. The method according to claim 1, wherein the finding a difference between the observation target and the at least one comparison object comprises:
capturing the region of interest of the user in the observation target; and finding a difference in the region of interest.

3. The method according to claim 1, wherein the finding a difference between the observation target and the at least one comparison object comprises:
extracting selected content from the observation target; and analyzing a difference between the selected content and corresponding content in the at least one comparison object.

4. The method according to claim 3, wherein the selected content comprises at least one of a word, a number, a special symbol, and an image.

5. The method according to claim 1, wherein the reminding a user of the specific difference for reminding comprises:
reminding the user in at least one of the following manners: a visual reminder, a sound reminder, a touch reminder, and a vibration reminder.

6. The method according to claim 1, wherein the reminding a user of the specific difference for reminding comprises:
reminding the user by superimposing a visual symbol on the observation target.

7. The method according to claim 1, wherein the part of or all differences comprises a difference on at least one of content, semantic, and a visual feature.

8. The method according to claim 1, wherein the method further comprises:
storing an image of the observation target.

9. The method according to claim 1, wherein the method further comprises:
obtaining at least one candidate comparison object.

10. An auxiliary observation apparatus, comprising:
a comparison object determining module, configured to determine at least one comparison object according to a degree of similarity to a feature of an observation target; and
an auxiliary observation module, configured to determine a part of or all differences between the observation target and the at least one comparison object,
wherein the at least one comparison object comprises a historical image of the observation target,
wherein the auxiliary observation module further comprises:
a difference search unit, configured to find a difference that is both visual and semantic between the observation target and the at least one comparison object; and
a reminding unit, configured to preset a reminder threshold for semantic difference; and
in response to determining that semantic difference of the difference exceeds the reminder threshold for semantic difference, determining the difference as a specific difference for reminding to prevent a user from overlooking important information or highlighting redundant information, and
wherein the feature comprises at least one of the following: a context, metadata, a visual feature, semantic meaning, and a circumstance of selected content.

11. The apparatus according to claim 10, wherein the difference search unit comprises:
a capturing subunit, configured to capture the region of interest of the user in the observation target; and a difference search subunit, configured to find a difference in the region of interest.

12. The apparatus according to claim 11, wherein the difference search unit comprises:
a content extracting subunit, configured to extract selected content from the observation target; and the difference search subunit is further configured to find a difference between the selected content and corresponding content in the at least one comparison object.

13. The apparatus according to claim 10, wherein the reminding unit reminds the user in at least one of the following manners: a visual reminder, a sound reminder, a touch reminder, and a vibration reminder.

14. The apparatus according to claim 10, wherein the reminding unit reminds the user by superimposing a visual symbol on the observation target.

15. The apparatus according to claim 10, wherein the apparatus further comprises:
a storage module, configured to store an image of the observation target.

16. The apparatus according to claim 10, wherein the apparatus further comprises:
a comparison object obtaining module, configured to obtain at least one candidate comparison object.

17. A non-transitory computer readable storage medium, wherein the non-transitory computer readable storage medium comprises executable instructions for:
determining at least one comparison object according to a degree of similarity to a feature of an observation target, wherein the feature comprises at least one of the following: a context, metadata, a visual feature, semantic meaning, and a circumstance of selected content;
finding a difference that is both visual and semantic between the observation target and the at least one comparison object;
presetting a reminder threshold for semantic difference; and
in response to determining that semantic difference of the difference exceeds the reminder threshold for semantic difference, determining the difference as a specific difference for reminding to prevent a user from overlooking important information or highlighting redundant information.

18. An auxiliary observation apparatus, comprising a central processing unit (CPU) and a memory, wherein the memory stores computer-executable instructions configured to perform the following steps, when executed by the CPU:
determining at least one comparison object according to a degree of similarity to a feature of an observation target, wherein the feature comprises at least one of the following: a context, metadata, a visual feature, semantic meaning, and a circumstance of selected content, and
wherein the at least one comparison object comprises a historical image of the observation target,
finding a difference that is both visual and semantic between the observation target and the at least one comparison object;
presetting a reminder threshold for semantic difference; and
in response to determining that semantic difference of the difference exceeds the reminder threshold for semantic difference, determining the difference as a specific difference for reminding to prevent a user from overlooking important information or highlighting redundant information.

* * * * *